Aug. 2, 1966     N. EPSTEIN     3,263,725

SCREW WITH COTTER PIN

Filed July 2, 1964

INVENTOR

NAT EPSTEIN

BY *Edward Halle*

ATTORNEY

United States Patent Office 3,263,725
Patented August 2, 1966

3,263,725
SCREW WITH COTTER PIN
Nat Epstein, 2 Foxhunt Lane, Lake Success, N.Y.
Filed July 2, 1964, Ser. No. 379,831
3 Claims. (Cl. 151—6)

This invention relates to screws, and in particular, a screw in which an automatic cotter pin is provided by means of an insert which is positioned at an end of the screw and with ends normally extending between the major and minor diameters of the threaded portion of the screw, and in particular, a screw having such an insert of a deformable metal such as used in a common cotter pin.

It is an object of this invention to provide a screw with cotter pin with deformable insert means over which a nut may be screwed and which will nevertheless remain in the screw, as a cotter pin, to retain the nut on the screw.

It is a further object of this invention to provide a screw which may be used without the need for additional safety wire, or cotter pins.

These and other objects are accomplished with the invention as described in the specification hereinbelow. The invention is illustrated in the accompanying drawings in which.

Similar numerals refer to similar parts throughout the several views.

Figure 1:
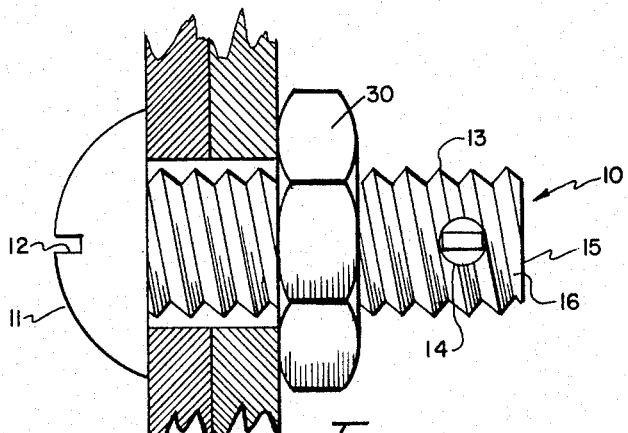
FIG. 1 is a side elevational view of one form of the device, partly in section.

The screw 10 is made of steel, stainless steel, aluminum, brass or bronze as well as in other alloys of metals. It may be cadmium plated or anodized or otherwise coated to suit the requirements of its use. The screw 10 may also be made in any standard or special size requested.

It is understood that wherever the word "screw" is used herein, it includes the word "bolt" or any other designation of a screw-type fastener having helical threads adapted to mate with other helical threads to secure the device to a work piece or to a nut or other such device.

The screw 10 usually has a head 11 with a slot or other means 12 to facilitate in driving the screw 10, and external threading or threads 13. The provision for the cotter pin feature is provided by placing a hole 14, similar to a cotter pin hole, near the end 15 of the screw shank 16. The cotter pin means is in the form of an insert 17 which is inserted in the hole 14 and is positioned so that its ends 18 will protrude slightly beyond the minor diameter of the threads 13.

Figure 2:
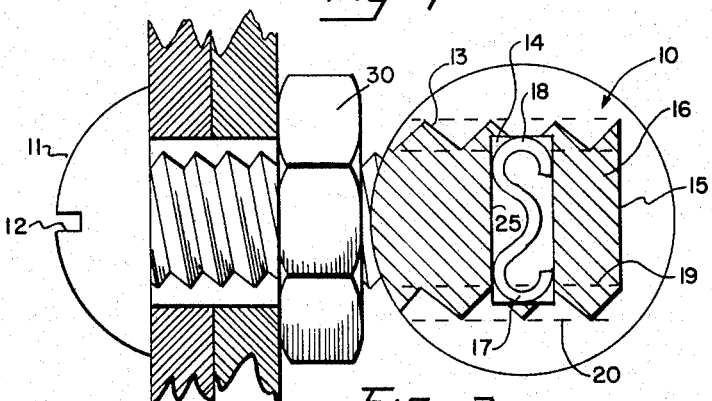
FIG. 2 is another elevational view of the form of device shown in FIG. 1, turned 90 degrees, with some parts in enlarged detail.
Figure 3:
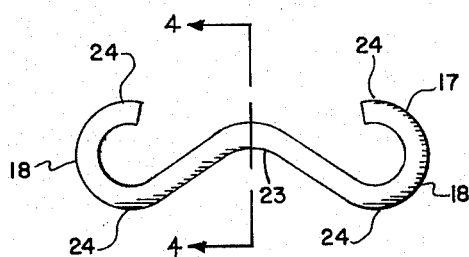
FIG. 3 is a plan view of the cotter pin of the device.
Figure 4:
FIG. 4 is a section along the lines 4—4 in FIG. 3.

Reference to FIG. 2 of the drawings shows two sets of dotted lines extending longitudinally from the end 15 of the shank 16 of the screw 10. The inner pair of dotted lines are imaginary lines designated by reference numeral 19 and represent the minor diameter, or thread root means, of the threads 13. The outer pair of dotted lines are imaginary lines indicated by reference numeral 20, and represent the major diameter, or thread crest means, of threads 13. The cotter pin or insert 17 is made of regular steel spring wire such as is used in the manufacture of an ordinary cotter pin having a half round shape in cross section as shown in FIG. 4 of the drawings, thus presenting a flat inner edge 21 and a rounded outer surface 22. The pin is designed with a generally U-shaped medial bend 23 and rounded ends 18. The rounded ends 18 comprise rounded bight means at the extreme ends, and arm means comprising bearing points 24. The arm means comprising bearing points 24 are designed to bear against the inner wall 25 of the hole 14. The distance between the outer measurements of bearing points 24 on each end 18 respectively of cotter pin 17 are slightly greater than the width or diameter of the hole 14. This is provided so that when the insert or cotter pin 17 is inserted into the hole, the bearing points 24 will exert an outward pressure against the wall 25 and maintain the insert in its normal position. The length of the insert 17 between ends 18 is designed so that when it is inserted as aforesaid, the outer ends of ends 18 will protrude beyond the minor diameter 19 of the threads 13.

When a screw 10 made in accordance with the invention has a nut 30 screwed onto its threads 13, the nut 30 will be screwed past the cotter pin or insert 17 until the nut is screwed against the work pieces, in this instance indicated by a pair of sheets 31 and 32, to hold the said work pieces together. The length of the screw 10 will be such that the nut 30 will have sufficient space beyond the cotter pin means or insert 17 so that it will clear the ends 18 when actually screwed home as shown in FIGS. 1 and 2 of the drawings. Thus, if the nut 30 should loosen and unscrew, since it hits ends 18 it will be stopped and retained in the same manner as if an ordinary cotter pin (not shown) had been inserted through the hole 14 and bent to maintain it in position. This will occur because when the insert, or cotter pin of the invention 17, is inserted, the end portions 18 which extend beyond the minor diameter 19 of the threads 13 will prevent the nut 30 from passing the point at which the said ends protrude. The reason why the nut 30 can be screwed past the ends 18 and yet will be prevented from returning, is that the ordinary force necessary to screw a nut home will usually be sufficient to cause the ends 18 of the insert 17 to be deformed inwardly. Yet the force tending to rotate a nut which has become loosened will not be sufficient to deform the ends 18 inwardly. Thus the nut 30 will be stopped at that time. This is why it is necessary to have the ends 18 protrude normally beyond the minor diameter 19.

In the preferred form of the invention, the ends 18 in normal position should also be within the limits of the major diameter 20. This is so that there will be no difficulty in the nut 30 passing the ends 18 which might occur if the ends 18 extended beyond the major diameter 20.

It is to be understood that the material of the insert is preferably made of steel wire which will have the deformable characteristics required as set forth hereinabove. An example of such steel wire would be the ordinary material for the usual well known type of cotter pin. Any other material of a deformable nature may be used.

While in the preferred form of the invention the cross section area of the wire of the insert 17 has been described as a half round, it may be made of any suitable cross sectional shape of wire from a round wire to a flat ribbon spring-type wire.

While I have described my invention in its preferred forms, there are other forms which it may take without departing from the spirit and scope of the invention, and I desire to be protected for all forms coming within the scope of the claims hereinbelow.

Wherefore I claim:
1. A screw, comprising: a shank including external helical thread means defining thread root means and thread crest means, a first end, a second end, and a through opening having inner wall means transverse the longitudinal axis of said shank, said opening being between said ends of said screw; said opening containing a deformable insert, comprising a wire having a generally U-shaped medial bend spaced from the inner wall means of said opening, and generally U-shaped ends, each end comprising arm means and rounded bight means with said arm means of each U-shaped end in resilient engagement with opposite portions of the inner wall means of said opening and with the rounded bight means of each of the U-shaped ends extending beyond said thread root means and being radially inwardly of said threaded crest means; said screw being adapted to receive in threaded engagement at least one nut to be positioned between said opening and said first end.

2. The construction as defined in claim 1 in which the said deformable insert comprises a metal wire having a flat inner side and a rounded outer surface.

3. The construction as defined in claim 1 in which said deformable insert comprises a metal wire having a flat inner side and a flat outer surface.

References Cited by the Examiner

UNITED STATES PATENTS

| | | | |
|---|---|---|---|
| 1,366,687 | 1/1921 | Arndt | 151—25 |
| 1,376,724 | 5/1921 | Neldner | 151—25 |
| 2,129,420 | 9/1938 | Guy | 151—6 |
| 2,297,831 | 10/1942 | Heard | 151—6 |
| 2,302,940 | 11/1942 | Denson | 151—69 |

EDWARD C. ALLEN, *Primary Examiner.*